United States Patent Office 3,746,750
Patented July 17, 1973

3,746,750
SOLUBILIZATION OF ORGANIC ACIDS
Adin Lee Stautzenberger and Alexander Fiske MacLean, Corpus Christi, Tex., assignors to Celanese Corporation, New York, N.Y.
No Drawing. Continuation of application Ser. No. 564,541, July 12, 1966. This application June 19, 1970, Ser. No. 48,936
The portion of the term of the patent subsequent to Nov. 23, 1988, has been disclaimed
Int. Cl. C07c 51/42, 63/54
U.S. Cl. 260—514 K             11 Claims

ABSTRACT OF THE DISCLOSURE

Process for purifying relatively insoluble acids such as terephthalic by forming a solution of the acid in an aqueous solution of weak acid salts of lithium, tertiary amines, or tertiary alkyl ammonium compounds, followed by treating the solution to reduce impurities present and recrystallization of the purified acid from solution.

---

This application is a continuation of application Ser. No. 564,541, filed July 12, 1966, now abandoned.

This invention relates to a method of increasing the solubility of organic acids. More particularly, the invention is directed to a process for increasing the solubility of organic carboxyic acids such as terephthalic acid by use in aqueous solution of weak acid salts of lithium, tertiary amines, or quaternary ammonium compounds.

The commercial importance of organic acids such as terephthalic acid in the production of polyesters and in many other uses has increased considerably in recent years. For example, an acid such as terephthalic acid is capable of entering into a condensation polymerization with various glycols, such as ethylene glycol and the like, to produce resinous compositions which are capable of being formed into valuable fibers and filaments. In order to obtain these products, however, it is necessary that the organic acids exist in a pure state. Because of the very low solubility of these organic acids, purification by normal procedures becomes extremely difficult. The most widely used procedure previously practiced for purification of insoluble organic acids is to convert the acid to an ester. This has the effect of not only neutralizing the acid, but the esters so produced have a much wider range of distillation temperatures thereby making physical separation feasible.

William G. Toland, Jr., in U.S. Pat. 2,664,440, discloses another prior process for purification in which terephthalic acid is reacted with a tertiary amine to form a salt which is readily soluble in aqueous solution. The salt, as such, is crystallized from solution and heated to decompose the salt to its corresponding terephthalic acid and tertiary amine, but this is a ratther cumbersome and expensive procedure.

It can thus be realized that while the methods of the prior art are effective in their own right as means for purifying and increasing the solubility of acids such as terephthalic acid, they tend to be impractical on a commercial scale. This is due to the expense required in maintaining reaction and distillation vessels as well as the extra procedures necessary to recover the acid as such.

It therefore becomes evident that it is important to find other means for purifying and increasing the solubility of organic acids which are simpler in their operation and more beneficial from an economic standpoint.

Accordingly, it is a primary object of this invention to provide a new and improved method for increasing the solubility of organic acids to make purification more economical. It is a further object of this invention to increase the solubility of organic carboxylic acids in aqueous solution thereby providing simple and more efficient means for purification. Still another object is to permit the direct recovery of organic carboxylic acids in the form of relatively large crystals by crystallization from an aqueous medium.

In general, the objects of this invention are accomplished by mixing the organic acid with an aqueous solution of a weak acid salt of (a) lithium; (b) a tertiary amine corresponding to the formula:

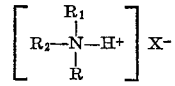

where the substituents $R_1$, $R_2$ and $R_3$ may be alkyl, aryl, or alkylaryl, and X may be any weak organic or inorganic acid radical; or (c) a quaternary ammonium compound of the formula $(R)_4N^+X^-$ wherein the R radicals represent alkyls of from 1–6 carbon atoms and $X^-$ is any weak organic or inorganic acid radical. Suitable weak organic or inorganic acids which form the anion of the salts of this invention are those which have pK values of from about 3 to 5. Examples of such weak acids include organic acids such as formic acid, acetic acid, propionic acid, butyric acid, isobutyric acid, succinic acid, lactic acid and p-choro-benzoic acid; and inorganic acids such as tetraboric acid, hydrofluoric acid, selenic acid, and telluric acid.

The amines which form the cation of the salts used in the practice of this invention are those having pK values of from about 2.5 to about 5.0. Suitable examples of such amines include trialkylamines, such as trimethylamine, triethylamine, tripropylamine, triisopropylamine, alkanolamines such as triethanolamine, trimethylolamine and triisopropanolamines, and cyclic amines such as N-methyl morpholine, cyclohexyldimethylamine, N-methyl-piperidine and N,N-dimethyl aniline.

Suitable examples of weak acid salts of tertiary amines used in the practice of this invention are triethylammonium acetate, triethylammonium formate, triethanolammonium acetate, trimethanolammonium butyrate, trimethylammonium acetate. N,N-dimethyl aniline acetate. Illustrative of the quaternary ammonium salts which may successfully be employed in the present invention are tetrabutylammonium acetate, tetrapropylammonium acetate, tetramethylammonium hydroxide. Examples illustrative of the lithium salts operative in this invention include lithium acetate, lithium propionate and lithium succinate. Organic coupling solvents such as water miscible alcohols and ketones may be advantageously added in an amount of up to about 70% of total volume, e.g. 2 to 50% of total volume, to further increase the solubility of the organic acid in the aqueous salt solution. Preferred alcohols include methyl alcohol, ethyl alcohol, isopropyl alcohol, ethylene glycol, tertiary butyl alcohol, n-butyl alcohol, etc. The ketones which are preferred include particularly acetone and methyl ethyl ketone.

Organic acids so solubilized are contained within the resulting solution in their original form. Appropriate means are available to remove impurities such as related aldehydes which are originally present and dissolved with the organic acids in the aqueous solution. For example, strong oxidizers such as permanganate, dichromate, or peracetic acid may be added to the solution to oxidize any aldehyde to its corresponding acid. For instance, when crude terephthalic acid containing 2.5% p-carboxybenzaldehyde as an impurity is dissolved to saturation in aqueous 2 M lithium acetate at 100° C., and 2.5 g. of potassium permanganate per 100 g. of dissolved crude terephthalic acid is added to the solution, the manganese dioxide formed by permanganate reduction is filtered off at 100° C., and the filtrate cooled to room temperature, the terephthalic acid crystals formed should contain less than 100 p.p.m. of p-carboxybenzaldehyde. Alternatively, aldehydes present in the mixture may be reacted with reagents such as hydroxyl amine to form an oxime which may be removed by extraction or recrystallization. In addition to giving high product purity, crystallization of the organic acids from solution has the advantage of producing crystals of large size. Any impurities occluded or otherwise physically entrapped within such large crystals can be readily removed by further recrystallization and washing.

The acid salts of lithium, tertiary amines, or quaternary ammonium compounds, may be prepared by any of the accepted procedures, for example, reacting lithium oxide with acetic acid to produce lithium acetate.

The salts so produced are dissolved in an aqueous solution to a molar concentration of from about 0.5 M to 4 M, preferably from 1 molar to 2 molar concentration. The solubilization of the organic acid may take place in solution having a temperature of from about 0 to 200° C. with a preferred temperature being 70 to 200° C. Appropriate superatmospheric pressure may be used to maintain the solution in liquid phase.

This invention is particularly useful for obtaining fiber-grade terephthalic acid. However, in its broad concept, it is similarly applicable in the purification of other solid organic carboxylic acids which may be aromatic, aliphatic, or cycloaliphatic in nature. Examples of such aromatic acids are phthalic acid, terephthalic acid, isophthalic acid, benzoic acid, p-carboxyphenyl acetic acid, p-p-dicarboxyl-diphenyl acid, p-t-butylbenzoic acid. Examples of cycloaliphaitc acids are hexahydrobenzoic acid, cis and trans-hexahydroterephthalic acid, hexahydrosalicylic acid, 2,5-dichlorocyclohexane-dicarboxylic acid-1,4; 2-chlorocyclohexane-dicarboxylic acid - 1,4; 4-chlorocyclohexanedicarboxylic acid-1,3; 4-chloro-1-carboxy-cyclohexane.

In the absence of indications to the contrary, all proportions and concentrations of materials are expressed herein on a weight basis.

The invention may additionally be described by the following examples:

EXAMPLE I

Solubility in water

Pure terephthalic acid was mixed with water and tested for solubility. Results indicated the acid was about 0.001% soluble at 25° C. and 0.03% soluble at 100° C. Practical recrystallization of terephthalic acid required a minimum of 25% solubility which was not attained in water until a temperature of 280° C. was reached. In sharp contrast, in a 2 M lithium acetate solution terephthalic acid reached 25% solubility at a temperature of 160° C.

Solubility in salt solution 50 g. of terephthalic acid was mixed with a 250 ml. of 2 molar aqueous solution of lithium acetate at a convenient laboratory temperature of 100° C. Tests showed the terephthalic acid to be 6.8% soluble in the salt solution. Recrystallization was possible from a solution saturated at 100° C. by reducing the temperature to 25° C. Crystals were filtered, washed with water, and dried for an hour at 110° C.

Analysis showed the needle-like crystals obtained to be 100% terephthalic acid and no evidence of lithium was found.

The solubility of terephthalic acid was found not to be in proportion to the concentration of the salt used as indicated by the following table.

TABLE I.—EFFECT OF SALT CONCENTRATION ON TEREPHTHALIC ACID SOLUBILITY

| LiOAc, M | °C. (±2°) | Solubility, g. TPA/100 g. solvent |
|---|---|---|
| 0.5 | 25 | 1.2 |
| 0.5 | 100 | 4.0 |
| 1.0 | 25 | 1.6 |
| 1.0 | 100 | 6.0 |
| 2.0 | 25 | 2.4 |
| 2.0 | 100 | 6.8 |
| 4.0 | 25 | 3.2 |
| 4.0 | 100 | 7.2 |

EXAMPLE II 250 ml. of 2 M solution of triethylammonium acetate (32.2%) in water was intimately mixed with 50 g. of terephthalic acid. Conventional solubility tests indicated that the acid was 4% soluble in the aqueous solution.

EXAMPLE III 50 g. of trans-hexahydroterephthalic acid was mixed with 250 ml. of water and tested for solubility by conventional means at 25° C. and 100° C. The test was repeated, at 20° C. and 100° C., using the same proportions, with a 1 M lithium acetate aqueous solution being substituted for the water of the first experiment. The results were as follows:

SOLUBILITY TO TRANS-HEXAHYDROTEREPHTHALIC ACID IN WATER AND 2 M LITHIUM ACETATE SOLUTION

| | Percent | | |
|---|---|---|---|
| Temperature | 20° C. | 25° C. | 100° C. |
| Trans-hexahydroterephthalic acid in water | | 0.1 | 1.3 |
| Trans-hexahydroterephthalic acid in 2 M lithium acetate solution | 1.7 | | 6.0 |

EXAMPLE IV

Experiments were conducted using 50 g. samples of terephthaldehydic acid and p-toluic acid. The samples were mixed with 250 ml. of water and a 2 M lithium acetate solution, respectively. The results of the conventional solubility tests are shown below:

SOLUBILITY OF TEREPHTHALDEHYDIC AND P-TOLUIC ACIDS IN WATER AND LITHIUM ACETATE SOLUTION

| | Percent | | |
|---|---|---|---|
| Temperature | 20° C. | 40° C. | 80° C. |
| Terephthaldehydic acid in water | 0.015 | 0.075 | 0.13 |
| Terephthaldehydic acid in lithium acetate solution | 8.00 | 10.60 | |
| p-Toluic acid in water | 0.035 | 0.08 | 0.45 |
| p-Toluic acid in lithium acetate solution | 3.00 | 3.58 | 7.8 |

EXAMPLE V

A number of experiments were conducted to test the solubility of terephthalic acid in various 2 M salt solutions. The results show that lithium and tertiary ammonium salts of weak acids are excellent solubilizers of terephthalic acid in aqueous solution. The following data indicate that such salt solutions have no effect on the total amount of terephthalic acid recovered in crystallization. The use of other salt solutions increased the solubility of the acid somewhat but analysis data exhibits a marked drop in the percentage analyzed as terephthalic acid upon recovery.

SOLUBILITY OF TEREPHTHALIC ACID IN AQUEOUS 2 M SALT SOLUTIONS

| Salt | Solubility, g./100 g. solvent at 100° | 25° product crystal analysis as TPA, percent |
|---|---|---|
| Ammonium acetate | 3.0 | 58 |
| Sodium acetate | 2.0 | 45 |
| Potassium acetate | 1.6 | 42 |
| Lithium acetate | 6.8 | 100 |
| Rubidium acetate | 2.0 | 44 |
| Cesium acetate | 0.8 | 40 |
| Trimethylammonium acetate | 3.0 | 100 |
| Triethanolammonium acetate | 7.0 | 100 |
| Lithium perchlorate | 0 | |
| Lithium chloride | 0.1 | |
| Lithium formate | 1.8 | 100 |
| Lithium propionate | 8.8 | 100 |
| Lithium succinate | 7.4 | 100 |
| Sodium acid succinate | 0.3 | 70 |
| Triethanolammonium acid oxalate | 0.2 | 100 |
| Lithium terephthalate (0.8 M) | 0.8 | 100 |
| Triethylammonium acetate | 4.0 | 100 |
| Sodium methanesulfonate | 0 | |
| Sodium toluenesulfonate | 0 | |
| Triethylammonium chloride | 0 | |
| Lithium aminoacetate | 12 | (¹) |

¹ No crystals.

EXAMPLE VI

Tests were conducted using a 2 molar lithium acetate solution to which was added varying percentages of ethanol or acetic acid as coupling agents. The resulting solubility data tabulated below show that the solubility of the organic acids in aqueous salt solution can be greatly affected by the addition of such coupling agents.

EFFECT OF COUPLING AGENTS ON SOLUBILITY OF SALT SOLUTION

| Solvent, 2 M lithium acetate | | Temp., °C. | Grams/100 g. solvent | |
|---|---|---|---|---|
| H₂O, percent | Ethanol, percent | | Terephth. acid | O-toluic |
| 100 | 0 | 100 | 6.8 | |
| 85 | 15 | 96 | 10.4 | 28.6 |
| 75 | 25 | 90 | 21.4 | 37.0 |
| 85 | 15 | 25 | 3.4 | 4.0 |
| 75 | 25 | 25 | 4.7 | 6.4 |
| 50 | 50 | 25 | 8.0 | 20.0 |
| 0 | 100 | 25 | 0.1 | |
| | Acetic acid, percent | | | |
| 85 | 15 | 25 | 0.4 | 0.6 |
| 75 | 25 | 25 | 0.9 | 0.8 |
| 75 | 25 | 102 | 2.8 | 20.8 |
| 50 | 50 | 102 | 1.1 | 17.0 |
| 50 | 50 | 25 | 0.3 | 3.1 |
| 0 | 100 | 115 | 0.1 | |

The principle, preferred embodiments, and modes of operation of the present invention have been described in the foregoing specification. However, it should be understood that the invention which is intended to be protected herein may be practiced otherwise than as described without departing from the appended claims.

We claim:

1. A process for treating a relatively insoluble organic carboxylic acid selected from the group consisting of phthalic acid, terephthalic acid, isophthalic acid, benzoic acid, p-carboxyphenyl acetic acid, p-p-dicarboxyl-diphenyl acid, p-t-butylbenzoic acid, hexahydrobenzoic acid, cis and trans-hexahydroterephthalic acid, hexahydrosalicylic acid, 2,5-dichlorocyclohexane-dicarboxylic acid-1,4; 2-chlorocyclohexane-dicarboxylic acid-1,4; 4-chlorocyclohexane-dicarboxylic acid-1,3; and 4-chloro-1-carboxy-cyclohexane, which acid contains an aldehyde impurity and recovering said carboxylic acid in crystalline form of increased impurity, which process comprises mixing said carboxylic acid with an aqueous solution with a salt of a weak acid, said weak acid having a pK value of from 3 to 5, said salt having a cation taken from the group consisting of (a) lithium,
(b) a tertiary ammonium ion corresponding to the formula:

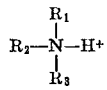

in which $R_1$, $R_2$ and $R_3$ may be alkyl, aryl or alkylaryl, and (c) quaternary ammonium ion of the formula $(R)_4N^+$ where each R represents the same or different alkyls of from 1 to 6 carbon atoms, heating the mixture to a temperature of between about 70 and 200° C. to dissolve said carboxylic acid, treating the resulting solution with a reagent to convert said impurity to a material which can be separated from said acid upon recrystallization, cooling said solution to a temperature sufficiently low to crystallize the carboxylic acid from said solution, and separating the thus crystallized carboxylic acid from the solution, which acid contains less of said impurity than originally contained in said carboxylic acid.

2. A process according to claim 1 wherein said weak acid salt has as a cation a tertiary ammonium ion corresponding to the formula

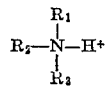

in which $R_1$, $R_2$ and $R_3$ may be alkyl, aryl, or alkylaryl.

3. A process according to claim 1 wherein said carboxylic acid is terephthalic acid containing carboxybenzaldehyde as an impurity, said weak acid salt is lithium acetate, and said treating is accomplished with an oxidizing agent to convert said aldehyde to the corresponding acid.

4. The process of claim 1 wherein said salt is lithium acetate.

5. The process of claim 1 wherein said salt is triethylammonium acetate.

6. The process of claim 1 wherein said carboxylic acid is transhexahydroterephthalic acid.

7. The process of claim 1 wherein said carboxylic acid is terephthalic acid.

8. The process of claim 1 wherein said treating is accomplished with an oxidizing agent.

9. The process of claim 8 wherein said carboxylic acid is terephthalic acid containing p-carboxybenzaldehyde impurities 10. The process of claim 9 wherein said weak acid salt is lithium acetate.

11. The process of claim 10 wherein the aqueous lithium acetate solution contains between about 5 and 70% of an organic coupling solvent taken from the group consisting of water miscible alcohols of from 1 to 5 carbon atoms, acetone and methyl ethyl ketone.

References Cited

UNITED STATES PATENTS 3,115,521   12/1963   Swakon _____ 260—525

FOREIGN PATENTS 23,401   10/1964   Japan _____ 260—525
723,680  12/1965   Canada _____ 260—525

OTHER REFERENCES

Tipson: "Crystallization and Recrystallization," in "Technique of Organic Chemistry, vol. III," 1956, pp. 472-3.

LORRAINE A. WEINBERGER, Primary Examiner
R. S. WEISSBERG, Assistant Examiner

U.S. Cl. X.R.
260—514 R, 514 J, 525